United States Patent
Kawano

(10) Patent No.: US 6,754,769 B2
(45) Date of Patent: Jun. 22, 2004

(54) DISK ARRAY CONTROLLER USING CROSSBAR SWITCHES AND METHOD OF CONTROLLING THE SAME

(75) Inventor: Masafumi Kawano, Tokyo (JP)

(73) Assignee: NEC Corporation, Tokyo (JP)

( * ) Notice: Subject to any disclaimer, the term of this patent is extended or adjusted under 35 U.S.C. 154(b) by 262 days.

(21) Appl. No.: 09/976,060

(22) Filed: Oct. 15, 2001

(65) Prior Publication Data

US 2002/0046323 A1 Apr. 18, 2002

(30) Foreign Application Priority Data

Oct. 13, 2000 (JP) ........................................ 2000-312846

(51) Int. Cl.[7] .............................................. G06F 13/00
(52) U.S. Cl. ........................ 711/114; 709/208; 709/209; 709/210; 709/211; 710/1; 710/317; 711/111; 711/112; 711/167
(58) Field of Search ...................... 710/1, 317; 379/291; 709/208–211; 711/111, 112, 114, 167

(56) References Cited

U.S. PATENT DOCUMENTS

| 5,889,969 A | * | 3/1999 | Getzlaff et al. | 710/113 |
| 6,094,715 A | * | 7/2000 | Wilkinson et al. | 712/20 |
| 6,578,126 B1 | * | 6/2003 | MacLellan et al. | 711/167 |
| 6,594,739 B1 | * | 7/2003 | Walton et al. | 711/155 |
| 6,611,879 B1 | * | 8/2003 | Dobecki | 710/1 |

FOREIGN PATENT DOCUMENTS

| JP | 10-143465 | 5/1998 |
| JP | 10-171746 | 6/1998 |
| JP | 11-296473 | 10/1999 |
| JP | 2000-99281 | 4/2000 |
| JP | 2000-099281 | 4/2000 |
| JP | 2002-533835 | 10/2002 |

OTHER PUBLICATIONS

Japanese Office Action dated Dec. 24, 2002, with partial English translation.
Japanese Office Action dated Apr. 8, 2003 with Partial English Translation.

* cited by examiner

Primary Examiner—T Nguyen
(74) Attorney, Agent, or Firm—McGinn & Gibb, PLLC

(57) ABSTRACT

In a disk array controller, the cache memory has memory modules and a plurality of clossbar switches. A plurality of host computer adapters are connected with the clossbar switches while a plurality of disk enclosure adapters are connected with the clossbar switches. The clossbar switches are connected with the memory modules. The clossbar switches have function to directly connect the host computer adapters to the disk enclosure adapters. Accordingly, data transfer between the host computer and the disk enclosure can be carried out, independent on memory data transfer capability to the cache memory.

22 Claims, 10 Drawing Sheets

DISK ARRAY CONTROLLER USING CROSSBAR SWITCHES AND METHOD OF CONTROLLING THE SAME

BACKGROUND OF THE INVENTION

The present invention relates to a disk array controller and a method of controlling disk array, in particular to the disk array controller and the method of controlling disk array, each of which is characterized in controlling data transfer between a host computer and disk devices.

A conventional disk array controller (hereunder called a first prior art) comprises host computer adapters each of which is connected to each host computer and which carry out data transfer, a cache memory which temporarily memorizes not only data transmitted from host computers and disk enclosures but also information for controlling the disk array controller, and disk enclosure adapters each of which is connected to each disk enclosure and which carry out data transfer. The host computer adapters, the disk enclosure adapters, and the cache memory are multi-connected to each other through a common bus. All of the data transfer is carried out by way of the cache memory.

In the first prior art, transfer performance is improved by enlarging bus width of the internal common bus and fastening transfer period of the internal common bus. However, a structure of a conventional common bus cannot catch up with improvement of performance of a host computer interface and a disk enclosure interface in the first prior art. In addition, reflection of signal wave is inevitably caused to occur due to the structure of the conventional common bus. Accordingly, it has become difficult to respond to a requirement for obtaining a disk array controller having high performance.

On the other hand, as a proposal for solving such a problem of the conventional disk array controller, for example, unexamined Japanese Patent Publication 2000-99281 discloses an another conventional disk array controller (hereunder called a second prior art) in which a host computer and a cache memory are connected to each other through a plurality of host computer adapters and in which a disk enclosure and a cache memory are connected to each other through a plurality of disk enclosure adapters. In this second prior art, fault-proof capability and a throughput of the disk array controller are improved to some extent by transferring data through a plurality of adapters. However, it has a limit to improve the throughput even in the second prior art thus mentioned.

SUMMARY OF THE INVENTION

It is therefore an object of the present invention to provide a disk array controller and a method of controlling disk array which are capable of further improving the throughput in the disk array controller.

Other objects of the present invention will become clear as the description proceeds.

According to an aspect of the present invention, there is provided a disk array controller for use in storing data transmitted and received between a host computer and a disk enclosure, comprising: at least one cache memory which stores the data transmitted and received between the host computer and the disk enclosure; the at least one cache memory including at least one memory module and a plurality of crossbar switches connected with the at least one memory module; a plurality of host computer adapters which connect the host computer with the at least one cache memory; a plurality of host computer adapters being connected with a plurality of crossbar switches; a plurality of disk enclosure adapters which connect the disk enclosure with the at least one cache memory; a plurality of disk enclosure adapters being connected with a plurality of crossbar switches; and a plurality crossbar switches have function to directly connect the host computer adapters to the disk enclosure adapters.

Each of a plurality of crossbar switches may directly connect each of the host computer adapters to each of the disk enclosure adapters in response to a command outputted from each of the host computer adapters.

The crossbar switches may transfer data in synchronization with each other.

One of a plurality of crossbar switches may be operable as a master while the others of a plurality of crossbar switches may be operable as a slave controlled by the master, so that a plurality of crossbar transfer data in synchronization with each other.

Each of a plurality of crossbar switches may have a buffer memory for temporarily storing data transmitted from the host computer adapters or the disk enclosure adapters.

The data transmitted from the host computer adapters or the disk enclosure adapters may include a command and a memory address, the data including the command and the memory address being collectively transmitted to the buffer memory.

According to another aspect of the present invention, there is also provided a disk array controller for use in storing data transmitted and received between a host computer and a disk enclosure, comprising: at least one cache memory which stores the data transmitted and received between the host computer and the disk enclosure; the at least one cache memory including at least one memory module and a plurality of crossbar switches connected with the at least one memory module; a plurality of host computer adapters which connect the host computer with the least one cache memory; a plurality of host computer adapters being connected with a plurality of crossbar switches; a plurality of disk enclosure adapters which connect the disk enclosure with the at least one cache memory; a plurality of disk enclosure adapters being connected with a plurality of crossbar switches; and a plurality of crossbar switches transferring data in synchronization with each other.

According to still another aspect of the present invention, there is also provided a method of controlling a disk array for use in a disk array controller including at least one cache memory which stored data transmitted and received between a host computer and a disk enclosure, a plurality of host computer adapters which connect the host computer with the at least one cache memory, a plurality of disk enclosure adapters which connect the disk enclosure with the at least one cache memory, the method comprising the steps of providing at least one memory module and a plurality of crossbar switches in the at least one cache memory; connecting a plurality of host computer adapters with a plurality of crossbar switches; connecting a plurality of disk enclosure adapters with a plurality of crossbar switches; connecting a plurality of crossbar switches with the at least on memory module; and directly connecting the host computer adapters to the disk enclosure adapters.

DETAILED DESCRIPTION OF THE PREFERRED EMBODIMENT

Figure 1:
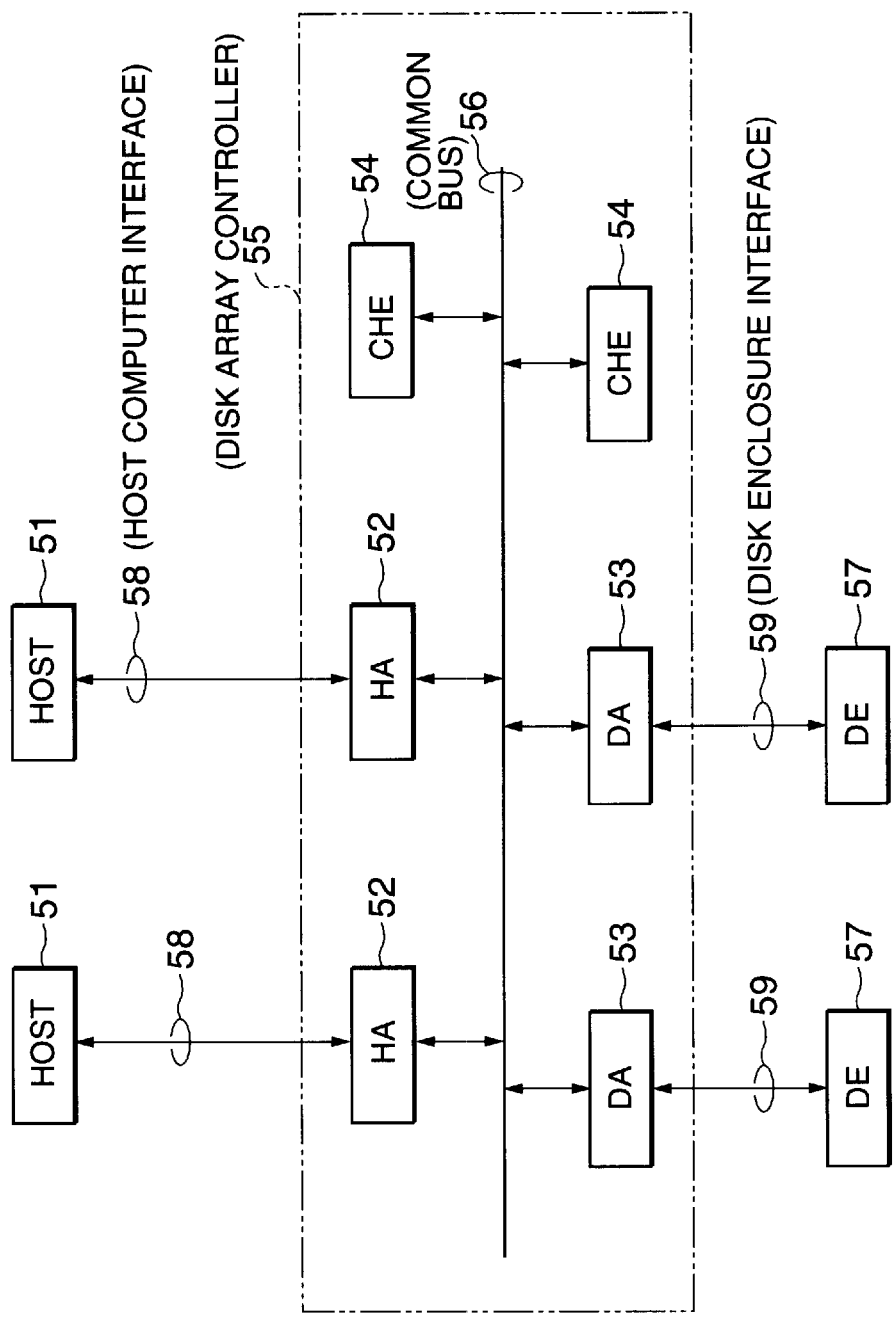
FIG. 1 is a block diagram for schematically showing a conventional disk array controller.

Referring to FIG. 1, description is, at first made about a conventional disk array controller as the first prior art in order to facilitate an understanding of the present invention. FIG. 1 is a block diagram for schematically showing the conventional disk array controller.

As illustrated in FIG. 1, the conventional disk array controller 55 comprises host computer adapters 52 each of which is connected to each host computer 51 and which carry out data transfer, cache memories 54 each of which temporarily memorizes not only data transmitted from host computers 51 and disk enclosures 57 but also information for controlling the disk array controller 55, and disk enclosure adapters 53 each of which is connected to each disk enclosure 57 and which carry out data transfer. The host computer adapters 52, the disk enclosure adapters 53, and the cache memories 54 are multi-connected to each other through a common bus 56. All of the data transfer is carried out by way of the cache memories 54.

As mentioned in the preamble of the instant specification, transfer performance is improved by enlarging bus width of the internal common bus 56 and fastening transfer period of the internal common bus 56 in the conventional disk array controller 55. However, a structure of the conventional common bus 56 cannot catch up with improvement of performance of host computer interfaces 58 and disk enclosure interfaces 59 illustrated in FIG. 1. In addition, reflection of signal wave is inevitably caused to occur due to the structure of the conventional common bus 56. Accordingly, it has become difficult to respond to a requirement for enabling the disk array controller 55 to have high performance.

Next, description proceeds to problems in the another conventional disk array controller as the second prior art for a better understanding of the present invention.

The inventor of the present invention has considered reasons for obstruction of improvement of the throughput in the another conventional disk array controller as the second prior art. As the result of consideration, main reasons for obstruction of improvement of the throughput are as follows;

(1) Since data are always transferred by way of a cache memory, the throughput cannot exceed data transfer rate of the cache memory.

(2) Although data are transferred to the cache memory by way of a plurality of access paths, the data are randomly transferred to the cache memory asynchronously per each access path. In other words, since the cache memory does not have a buffer memory, re-try operations are often required. For example, since some data are transferred to the cache memory by way of a plurality of access paths, writing destinations of some data are overlapped to each other in the cache memory. As a result, re-try operations are required in that case.

(3) Data cannot be transferred until an access path to the transfer destination has been established among a plurality of access paths.

The present invention has been created as the result of consideration (1), (2) and (3).

Figure 2:
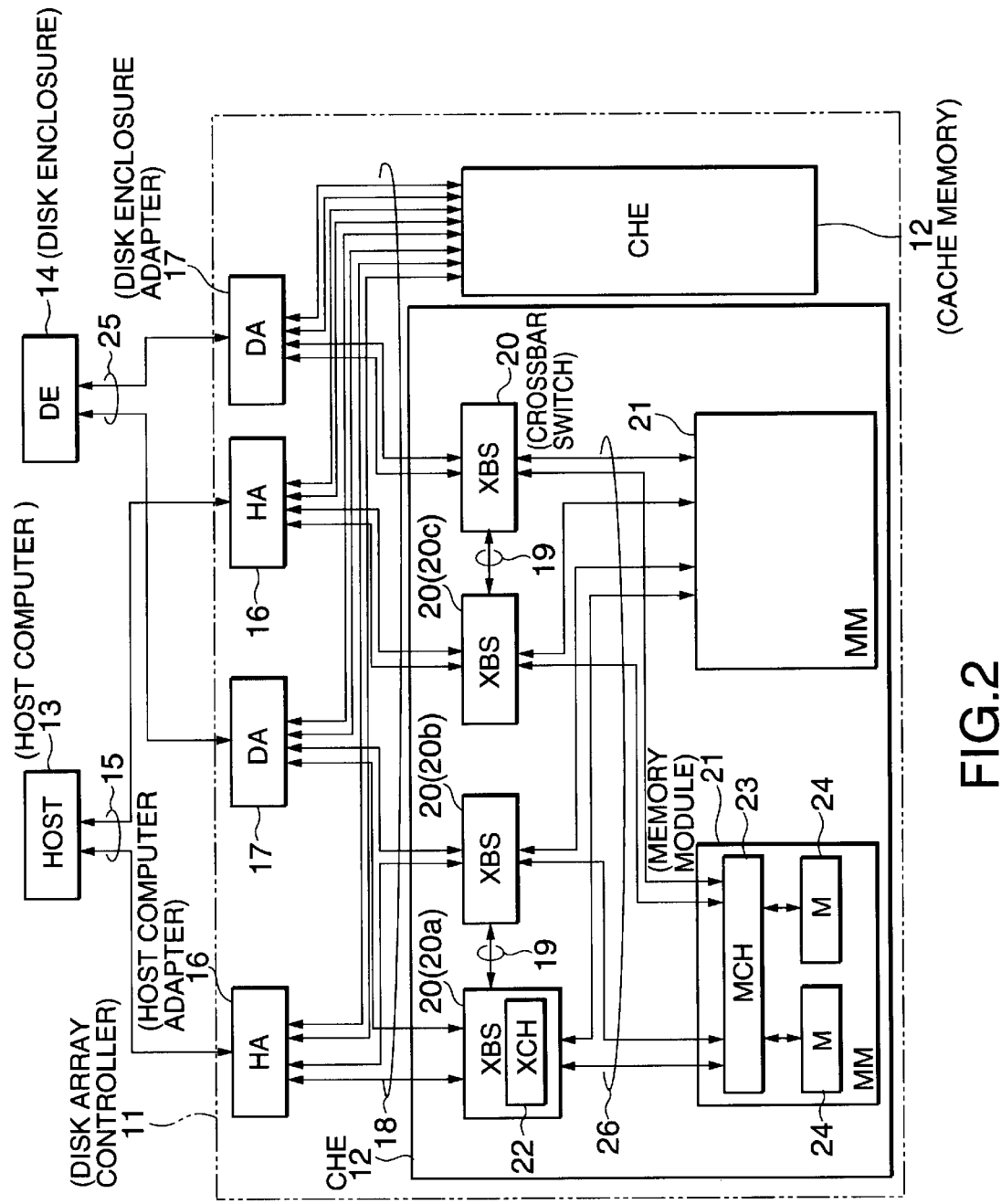
FIG. 2 is a block diagram for schematically showing a disk array controller according to a preferred embodiment of the present invention.

Now, referring to FIGS. 2 through 10, description will proceed to a disk array controller according to a preferred embodiment of the present invention. Besides, a method of controlling a disk array according to the present invention is applied to the disk array controller according to this preferred embodiment. Therefore, description about the method of controlling a disk array according to an embodiment of the present invention will be omitted. FIG. 2 is a block diagram for schematically showing the disk array controller according to the preferred embodiment of the present invention.

In FIG. 2, illustrated is a disk array controller 11 according to the preferred embodiment of the present invention. The disk array controller 11 is for use in storing data transmitted and received between a host computer 13 and a disk enclosure 14. As illustrated in FIG. 2, the disk array controller 11 has cache memories 12 which store data (information for controlling a disk array are included in the data) transmitted and received between the host computer 13 and the disk enclosure 14. The host computer 13 is connected with the cache memories 12 through a plurality of host computer adapter 16 while the disk enclosure 14 is connected with the cache memories 12 through a plurality of disk enclosure adapter 17.

Further, the cache memories 12 have memory modules 21 and a plurality of clossbar switches 20, respectively. In FIG. 2, although memory modules 21 and a plurality of clossbar switches 20 are depicted only in one of the two cache memories 12, memory modules 21 and a plurality of clossbar switches 20 are provided similarly in another one of the two cache memories 12. As illustrated in FIG. 2, respective host computer adapter 16 are connected with a plurality of clossbar switches 20 while respective disk enclosure adapter 17 are connected with a plurality of clossbar switches 20. In addition, respective clossbar switches 20 are connected with the memory modules 21.

Hereunder, further detailed description is made as regards a composition of the disk array controller 11 with reference to FIG. 2 continued. As illustrated in FIG. 2, the host computer 13 is connected with a plurality of host computer adapter 16 through a host computer interface 15 while the disk enclosure 14 is connected with a plurality of disk enclosure adapter 17 through a disk enclosure interface 25. A plurality of host computer adapter 16 and a plurality of disk enclosure adapter 17 are connected with the two physically independent cache memories 12 through SX bus 18. Further, a plurality of clossbar switches 20 are connected with the two physically independent memory modules 21 through MX bus 26. In addition, a plurality of clossbar switches 20 are simultaneously operable in synchronization with each other through a clossbar switch interface 19. Each of clossbar switches 20 has internally two clossbar switch channels 22, although only one crossbar switch channel 22 is depicted in only one clossbar switch 20 (20a).

Next, referring to FIG. 2 continued, description proceeds to a schematic operation of the disk array controller 11. The description is made about an example thereof in which data are transferred from the host computer 13 to the cache memories 12. At first, the host computer 13 transfers data to the host computer adapter 16 through the host computer interface 15. The host computer adapter 16 which has received the data from the host computer 13 divide the received data into two packets. Thereafter, the host computer adapter 16 simultaneously transfers one of the two packets to two clossbar switches 20, respectively, which are connected with the host computer adapter 16. Each of the two clossbar switches 20, which has received one of the two packets, respectively, from the host computer adapter 16, transfers the divided packet to the memory channel 23 in the memory module 21 simultaneously in synchronization with each other through the clossbar switch interface 19. Finally, the memory channel 23 which has simultaneously received the divided two packets, combines the divided two packets into single data. The memory channel 23 then writes the single data to one of memories 24. Besides, in case, for example, that data are transferred from the disk enclosure 14 to the cache memories 12, namely in case that an access through the cache memories 12 is conducted, an operation similar to the schematic operation thus mentioned will be carried out.

In this embodiment, after the data are divided into a plurality of packets, the divided packet data are simultaneously transferred to be combined into single data. As a result, transfer speed is improved, compared with conventional disk array controllers. In other words, data transfer as several packets simultaneously transferred is so efficient, compared with conventional cases that data are transferred per each packet. Accordingly, instantaneous data transfer rate is improved in this embodiment.

On the other hand, in a case that data transfer mode of the host computer adapter 16 and the disk enclosure adapter 17 are a sequential transfer mode, the SX bus 18 is directly connected with the host computer adapter 16 and the disk enclosure adapter 17 by the clossbar switches 20. Accordingly, data transfer can be carried out without using the cache memories 12.

Figure 3:
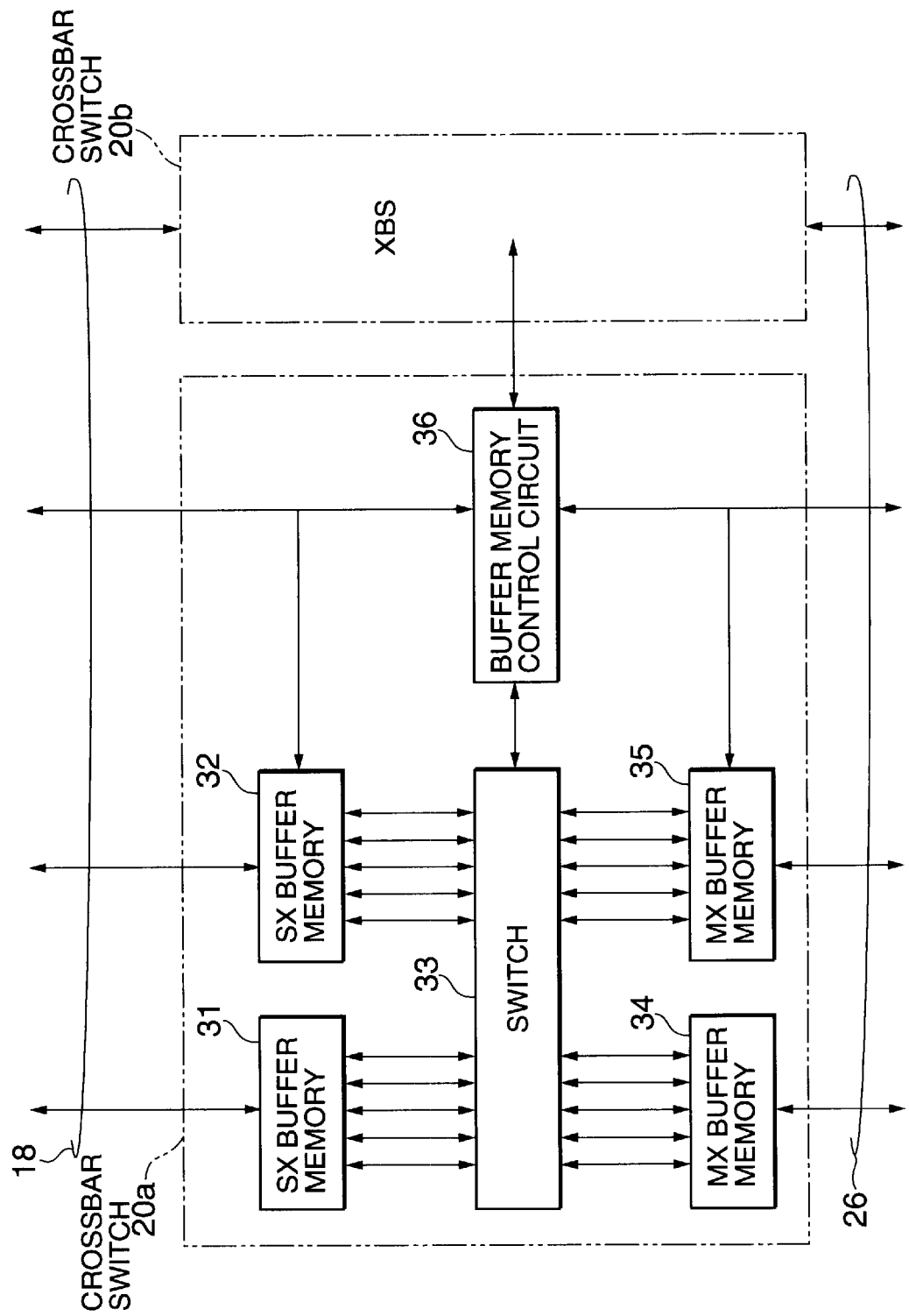
FIG. 3 is a block diagram for schematically showing an example of a clossbar switch in the disk array controller illustrated in FIG. 2.

FIG. 3 is a block diagram for schematically showing an example of a clossbar switch 20 in the disk array controller 11. Hereunder, referring to FIG. 3, description is made about an internal structure of the clossbar switch 20 (20a) with reference to FIG. 2 continued.

In FIG. 3 (also in parentheses adjacent to the reference numerals 20 of FIG. 2), the two clossbar switches 20 are depicted by reference numerals 20a, 20b, respectively.

Although illustrated as regards only the clossbar switch 20a in FIG. 3, the clossbar switches 20a, 20b respectively comprises SX buffer memories 31, 32 connected with the host computer adapter 16 and the disk enclosure adapter 17, MX buffer memories 34, 35 connected with the memory modules 21, a switch 33 which connects the SX buffer memories 31, 32 with the MX buffer memories 34, 35, and a buffer memory control circuit 36 which controls internal data transfer of the clossbar switches 20a, 20b. Besides, each clossbar switch channel 22 is consisting mainly of the SX buffer memories 31, 32 and a part of the buffer memory control circuit 36.

The SX buffer memories 31, 32 and the MX buffer memories 34, 35 are consisting of five buffer memories, respectively. As an example, description is made about a case that data write operation is conducted from the host computer adapter 16 to the memory modules 21. "Command, Address, Data" are collectively transferred, as a request, from the host computer adapter 16. For example, in case that data are received in the third buffer memory among the five buffer memories of the SX buffer memory 31 in the clossbar switch 20a, the buffer memory control circuit 36 indicates the adjacent clossbar switch 20b to receive data from the host computer adapter 16 by a third buffer memory among five buffer memories of SX buffer memory (not shown) also in the adjacent clossbar switch 20b. The buffer memory control circuit 36, based on data transfer destination ("Address") stored in the third buffer memory, changes the switch 33 in order to settle a path between the SX buffer memory 31 and the MX buffer memories 34, 35. Herein, the SX buffer memory 31 is capable of storing five requests at the maximum in the order of arrival from the host computer adapter 16. The requests are transferred to the MX bus 26 on demand in the order capable of transferring. When data are outputted to the MX bus 26, the corresponding request is also outputted to the MX bus 26 in synchronization with the data by an indication from the buffer memory control circuit 36 in the clossbar switch 20a or the clossbar switch 20b.

According to the disk array controller 11 of this embodiment, data transfer speed is improved therein, since a plurality of access paths to the cache memory 12 are available. Further, the clossbar switches 20 have functions to directly connect the host computer adapter 16 with the disk enclosure adapter 17. Namely, the clossbar switches 20 are nothing but conductive wiring for the data. As a result, the host computer adapter 16 is directly connected with the disk enclosure adapter 17 by way of no cache memory 12. Accordingly, data transfer between the host computer 13 and the disk enclosure 14 can be carried out, independent on memory data transfer capability to the cache memory 12. Further, the clossbar switches 20 have buffer memories (namely, the SX buffer memories 31, 32 and the MX buffer memories 34, 35) which temporarily store the data transmitted from the host computer adapter 16 or the disk enclosure adapter 17. Therefore, even if cache addresses of transfer destinations are overlapping in a plurality of access paths, the overlapping can be buffered in the buffer memories (the SX buffer memories 31, 32 and the MX buffer memories 34, 35). Deterioration of the throughput can be prevented in the disk array controller 11.

Figure 4:
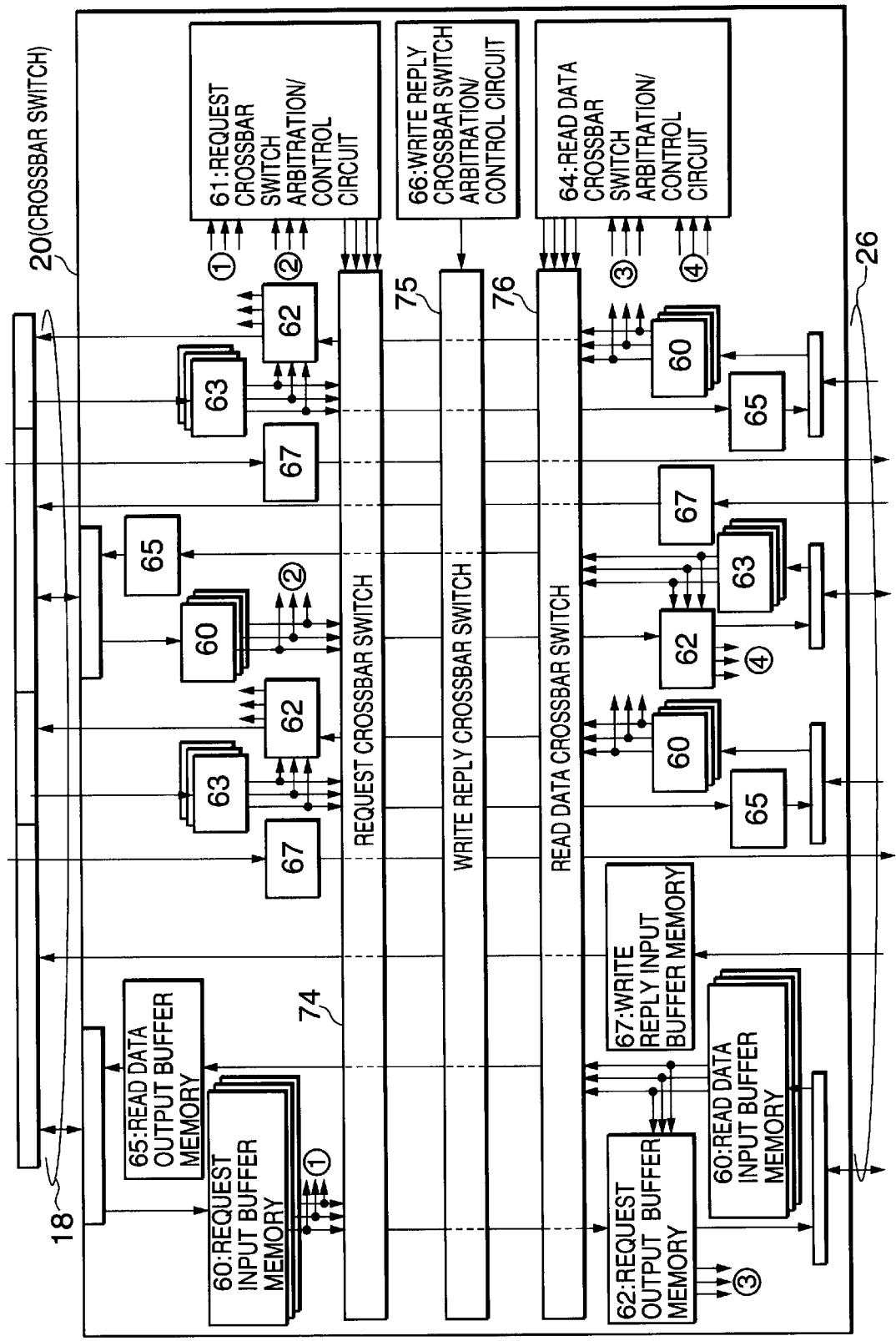
FIG. 4 is a block diagram for showing an example of a clossbar switch in detail in the disk array controller illustrated in FIG. 2.

Now, referring to FIGS. 4 through 10, more detailed description will be made as regards the disk array controller 11. FIG. 4 is a block diagram for showing an example of the clossbar switch 20 in detail in the disk array controller 11. Hereunder, the crossbar switch 20 is described more in detail referring to FIG. 4 with reference to FIG. 3 continued.

In FIGS. 3 and 4, the SX buffer memories 31, 32 and the MX buffer memories 34, 35 each of which is illustrated in FIG. 3 are corresponding to request input buffer memories 60, request output buffer memories 62, read data input buffer memories 63, read data output buffer memories 65, and write reply input buffer memories 67 each of which is illustrated in FIG. 4. The switch 33 illustrated in FIG. 3 is corresponding to a request clossbar switch 74, a write reply clossbar switch 75, and a read data clossbar switch 76 each of which is illustrated in FIG. 4. The buffer memory control circuit 36 is corresponding to a request clossbar switch arbitration/control circuit 61, a write reply clossbar switch arbitration/control circuit 66, and a read data clossbar switch arbitration/control circuit 64 each of which is illustrated in FIG. 4.

Figure 5:
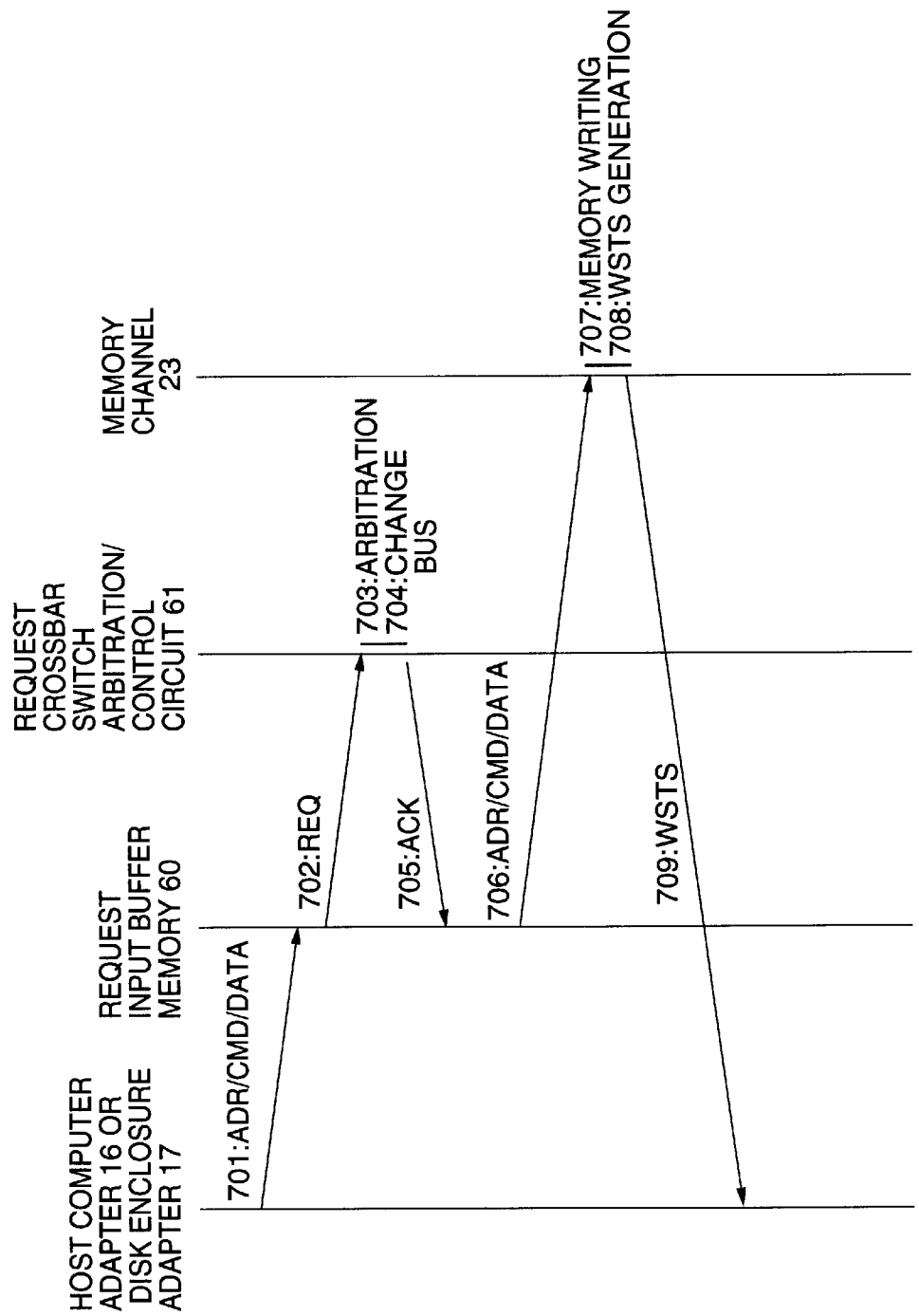
FIG. 5 is a flow chart for schematically showing data write processing from host computer adapters or disk enclosure adapters to a memory module in the disk array controller illustrated in FIG. 2.

FIG. 5 is a flow chart for schematically showing data write processing from the host computer adapter 16 or the disk enclosure adapter 17 to the memory module 21 in the disk array controller 11. Hereunder, the data write processing are described in detail referring to FIG. 5 with reference to FIGS. 2 and 4 continued.

As depicted in FIG. 5, ADR (address), CMD (command) and DATA (data) are transferred from the host computer adapter 16 or the disk enclosure adapter 17 to the clossbar switch 20 in step 701. These ADR, CMD and DATA are stored in the request input buffer memory 60 within the clossbar switch 20. A port through which data are outputted to the memory module 21 is judged based on the above ADR and CMD. A connection request is issued to the request clossbar switch arbitration/control circuit 61 in step 702.

When a plurality of connection requests to the same port are generated, the connection requests are arbitrated by the request clossbar switch arbitration/control circuit 61. Even though data stored in the request input buffer memory 60 are in waiting condition for being transferred, next data can be received from the host computer adapter 16 or the disk enclosure adapter 17. This is because a plurality of request input buffer memories 60 are provided with respect to one host computer adapter 16 or one disk enclosure adapter 17. With respect to the data stored in a plurality of the request input buffer memories 60, a connection request can be issued to the request clossbar switch arbitration/control circuit 61 in spite of the order of input.

As the result of arbitration in step 703, it is decided which data can use the port to the memory channel 23. Namely, using right of the port to the memory channel 23 is determined as the result of arbitration in step 703. Bus change is conducted with respect to the request clossbar switch 74. The data are then transferred to the memory channel 23. In step 707, the memory channel 23 decides the memory 24 to be accessed, based on the received ADR and CMD, and then writes DATA to the memory 24. In step 708, the memory channel 23 produces a status as the result of write access to the memory 24 (WSTS). The memory channel 23 then sends the WSTS to the host computer adapter 16 or the disk enclosure adapter 17 as a write request source. At this time, the memory channel 23 adds an agent number to WSTS with respect to the write request source, that is, the host computer adapter 16 or the disk enclosure adapter 17, and then sends the WSTS thereto.

Figure 6:
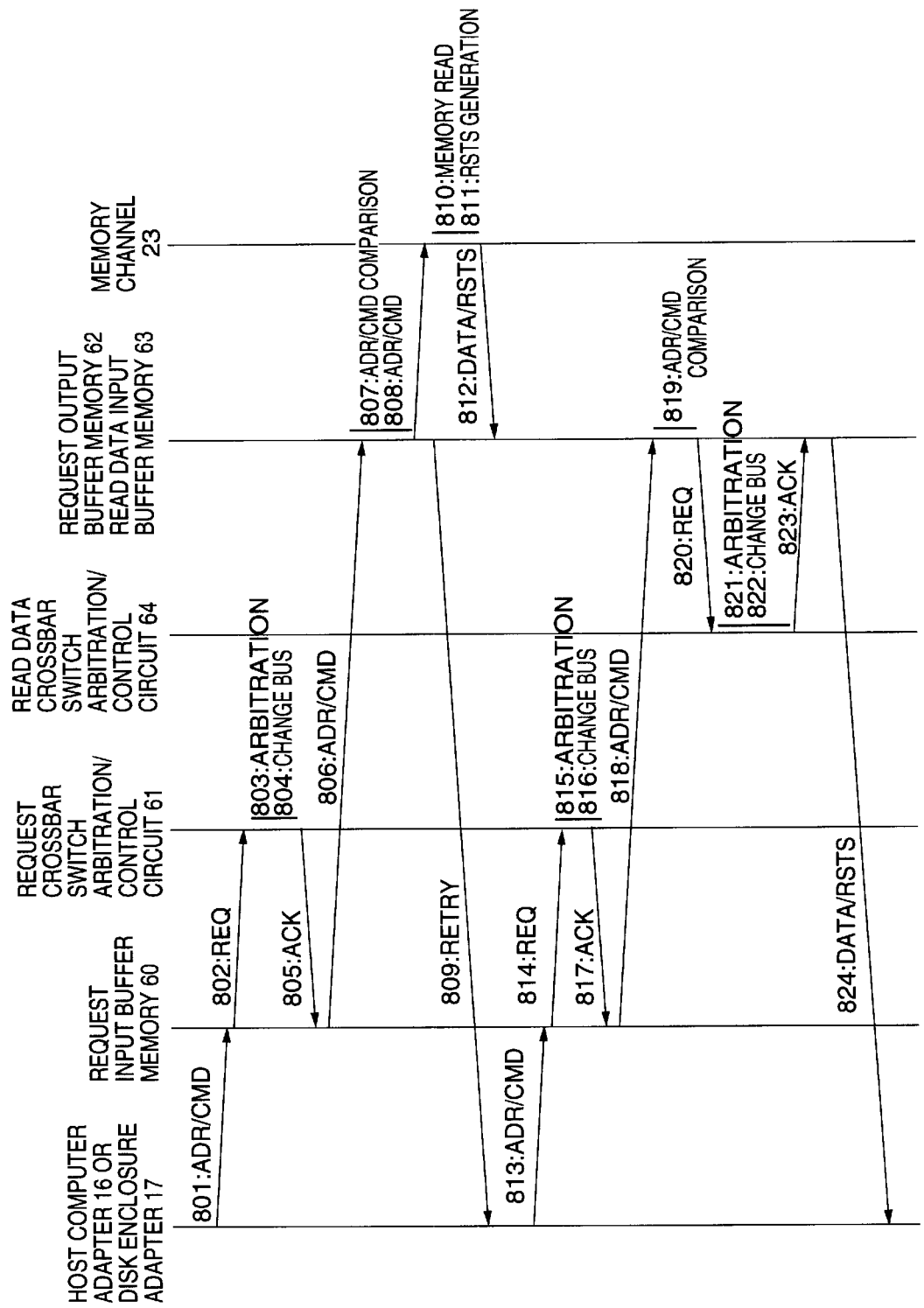
FIG. 6 is a flow chart for schematically showing data read processing from host computer adapters or disk enclosure adapters to a memory module in the disk array controller illustrated in FIG. 2.

FIG. 6 is a flow chart for schematically showing data read processing from the host computer adapter 16 or the disk enclosure adapter 17 to the memory channel 23 in the disk array controller 11. Hereunder, the data read processing are described in detail referring to FIG. 6 with reference to FIGS. 2 and 4 continued.

As depicted in FIG. 6, ADR and CMD are transferred from the host computer adapter 16 or the disk enclosure adapter 17 to the clossbar switch 20 in step 801. These ADR and CMD are stored in the request input buffer memory 60 within the clossbar switch 20. A port through which data are outputted to the memory channel 23 is judged based on the above ADR and CMD. A connection request is issued to the request clossbar switch arbitration/control circuit 61 in step 802. As the result of arbitration in step 803, bus change is conducted with respect to the request output buffer memory 62 as a destination. In step 806, ADR and CMD are transferred from the request input buffer memory 60 to the request output buffer memory 62.

In step 807, these transferred ADR and CMD are compared with another ADR and CMD stored in the read data input buffer memory 63. If requested data are not stored in the read data input buffer memory 63, ADR and CMD are transferred to the memory channel 23. The request clossbar switch arbitration/control circuit 61 requests data read and urges a request source, that is, the host computer adapter 16 or the disk enclosure adapter 17 to re-try. The re-try urged host computer adapter 16 or disk enclosure adapter 17 can issue an access request by the same ADR and CMD again or another access request by another ADR and CMD.

In step 810, the memory channel 23 decides the memory 24 to be accessed, based on the received ADR and CMD, and then reads DATA from the memory 24. Further, the memory channel 23 produces a status as the result of read access to the memory 24 (RSTS). In step 812, the memory channel 23 then sends the read data and the RSTS in this order to the read data input buffer memory 63 in the clossbar switch 20. The read data and the RSTS are then stored in the read data input buffer memory 63. At this time, ADR and CMD used in the memory access are also stored therein as access information.

In step 813, the host computer adapter 16 or the disk enclosure adapter 17 issues the same access request as ADR and CMD outputted in step 801. These ADR and CMD are stored in the request input buffer memory 60. Thereafter, processing similar to those of the steps 802 to 806 are conducted. The ADR and CMD are transferred to the request output-buffer memory 62 to be stored therein. After the ADR and CMD are stored in the request output buffer memory 62, these ADR and CMD are compared with another ADR and CMD stored in the read data input buffer memory 63 again in step 819.

If these ADR and CMD are judged to be equal to another ADR and CMD, in step 820, a request is issued to the read data clossbar switch arbitration/control circuit 64 in order that the read data output buffer memory 65 (which is connected with the host computer adapter 16 or the disk enclosure adapter 17 as an access request source) are connected with the read data input buffer memory 63. Bus using right is obtained in step 821. Bus change is then conducted in step 822. In step 824, the read data and the RSTS are transferred to the host computer adapter 16 or the disk enclosure adapter 17 as an access request source.

Figure 7:
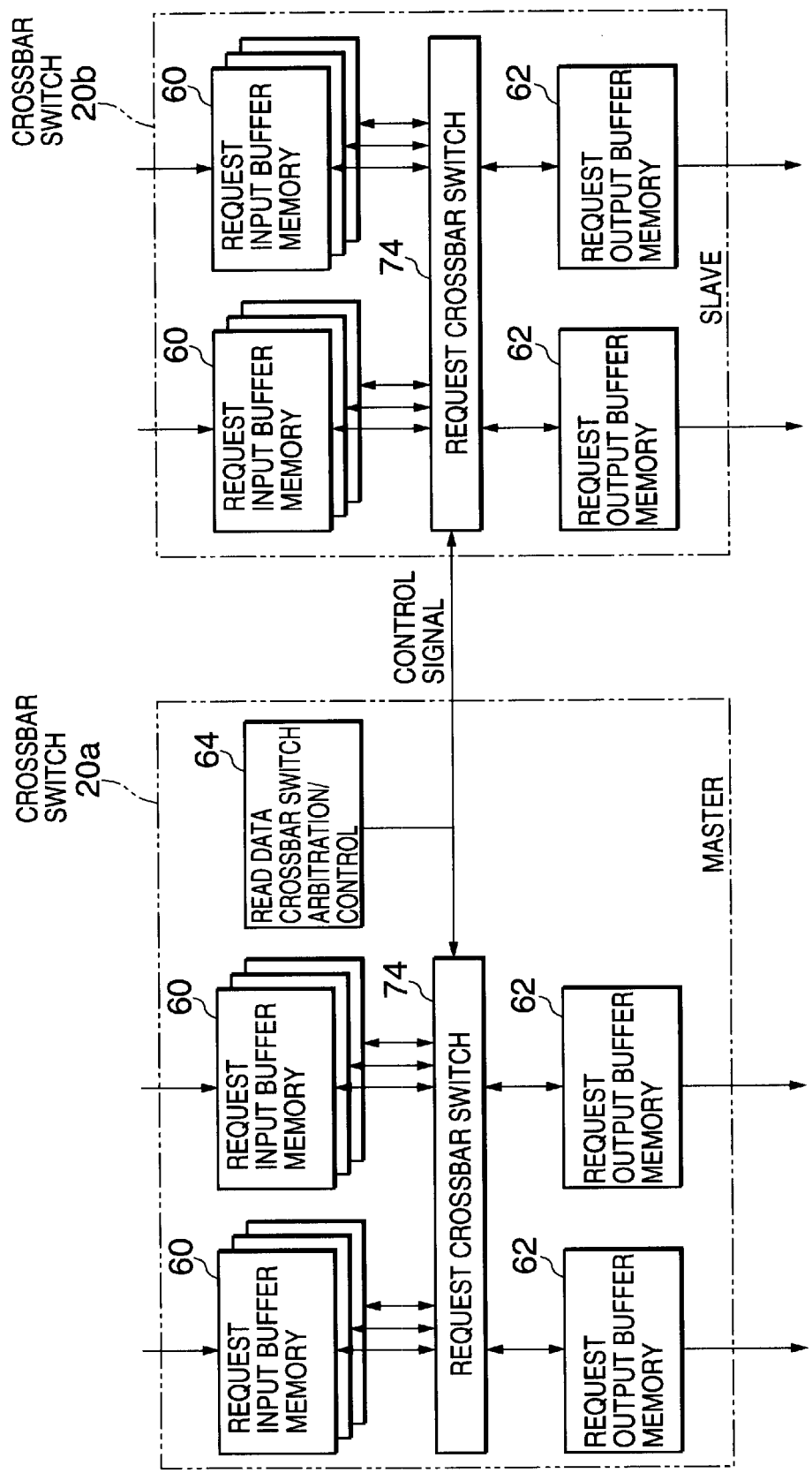
FIG. 7 is a block diagram for schematically explaining a synchronous transfer of a clossbar switch in the disk array controller illustrated in FIG. 2.

FIG. 7 is a block diagram for schematically explaining a synchronous transfer of a clossbar switch in the disk array controller 11. Hereunder, the synchronous transfer of the clossbar switch is described in detail referring to FIG. 7 with reference to FIGS. 2 and 4 continued.

Two clossbar switches 20 are connected with each one host computer adapter 16. The two clossbar switches 20a, 20b carry out data transfer in synchronization with each other. Since a plurality of crossbar switches are thus operable in synchronization with each other, one of the clossbar switches 20a is operable as a master while the other of the crossbar switches 20b is operable as a slave controlled by the master. The clossbar switches 20a, 20b are composed of LSI (Large Scale Integration) circuits, respectively. Therefore, the clossbar switch 20a becomes operable as the master by connecting a master enable terminal of the LSI circuit of the clossbar switch 20a to ground (GND).

Functions of LSI circuits of which the crossbar switch 20a and the clossbar switch 20b are respectively composed are the same as each other between the master and the slave. However, the arbitration circuit becomes disable, when the master enable terminal is pullup.

Next, description proceeds data writing operations from the host computer adapter 16 to the memory 24.

The host computer adapter 16 transfers address/ command/data as packet data divided into two parts to the clossbar switches 20a, 20b simultaneously. The read data clossbar switch arbitration/control circuit 64 confirms a command from the host computer 13. When the command is confirmed to be a write command from the host computer 13, the read data clossbar switch arbitration/control circuit 64 decides which request input buffer memories 60 should store the data therein. The read data clossbar switch arbitration/control circuit 64 then indicates the decided request input buffer memory 60 to store the data therein. A couple of three requests input buffer memories 60 are provided in the clossbar switches 20a, 20b, respectively. The read data clossbar switch arbitration/control circuit 64 has tables for memorizing data transfer destinations per each request input buffer memory 60. Accordingly, the read data clossbar switch arbitration/control circuit 64 controls the data transfer destinations by the use of the tables. Now, in a case that the clossbar switch 20a receives packet data of address/write command/data in this order from the host computer 13, the read data clossbar switch arbitration/ control circuit 64, by using a control signal designating the input buffer number of four bits, indicates a request input buffer memory 60 in which the packet data are stored. At this time, the same input buffer number is used as each other in the above-mentioned master and slave for selecting the request input buffer memory 60. Thus, both the master and the slave can store the data in the request input buffer memory 60 of the same number.

After the data have been stored in the request input buffer memory 60, the read data clossbar switch arbitration/control circuit 64 transfers the data from the request input buffer memory 60 to the memory 24 through the request output buffer memory 62. At this time, decision of the data transfer path is made by the read data clossbar switch arbitration/ control circuit 64. When a path between the request input buffer memory 60 and the memory 24 is unoccupied, the read data clossbar switch arbitration/control circuit 64 outputs the above-mentioned control signal including not only the designated number of the request input buffer memory 60 but also a designated number of the memory module 21. The read data crossbar switch arbitration/control circuit 64 connects a transfer source and a transfer destination by the clossbar switch 20 and then carries out the data transfer. The read data clossbar switch arbitration/control circuit 64 conducts arbitration per each request input buffer memory 60. As a result, a plurality of data can be transferred, unless the memory 24 is overlapped as transfer destinations.

Figure 8:
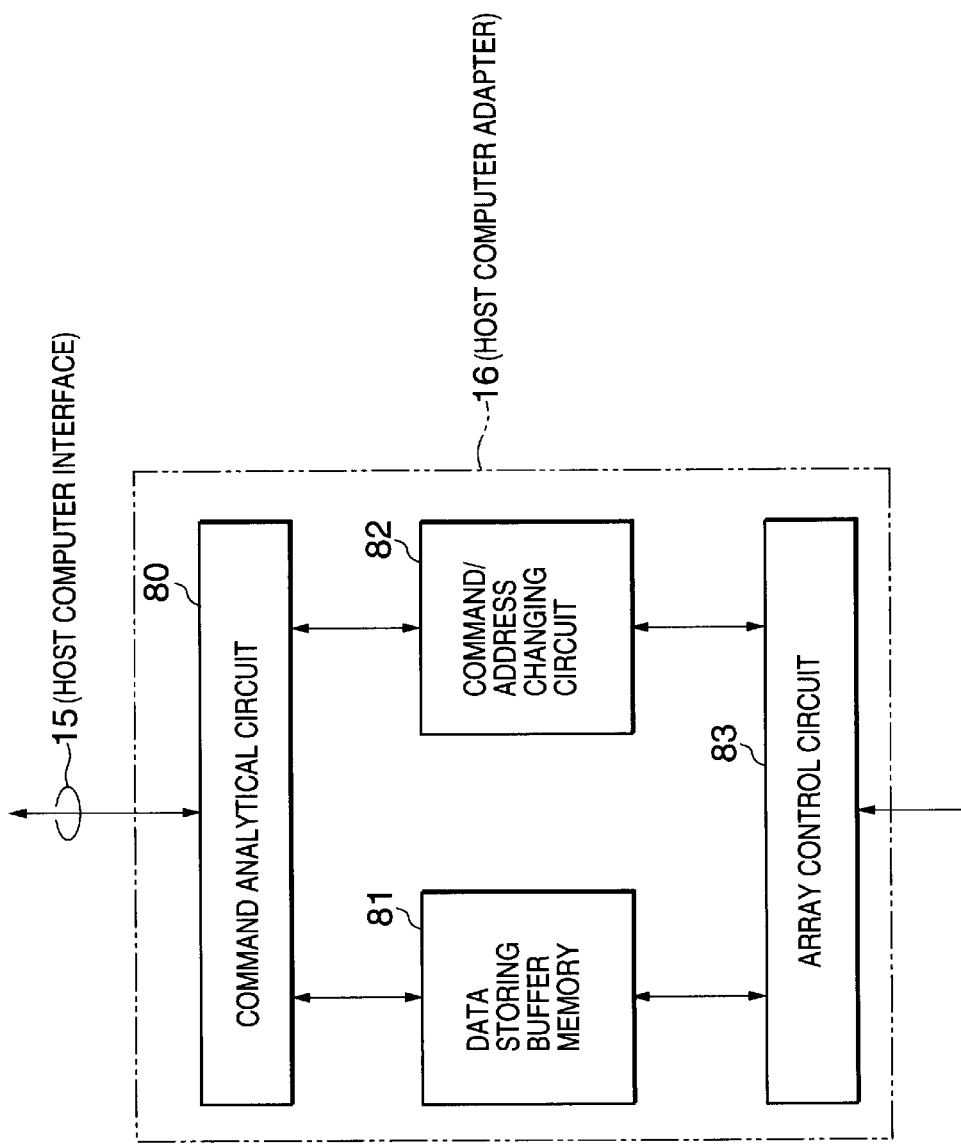
FIG. 8 is a block diagram for schematically showing an example of a host computer adapter in the disk array controller illustrated in FIG. 2.

FIG. 8 is a block diagram for schematically showing an example of the host computer adapter 16 in the disk array controller 11. Hereunder, judgment of serial transfer by the host computer adapter 16 is described in detail referring to FIG. 8 with reference to FIG. 2 continued.

In the host computer adapter 16, a command analytical circuit 80 judges a transfer mode from the host computer 13. When the command from the host computer 13 is judged to be a sequential write or read command, a command/address changing circuit 82 changes the command and the address (the address is changed into a physical address) in order that the data transferred from the host computer 13 may be directly transferred to the disk enclosure adapter 14. The data transferred from the host computer 13 are temporarily stored in a data storing buffer memory 81. An address control circuit 83 sends the data stored in the data storing buffer memory 81 by the changed address to the clossbar switch 20. Protocol thereafter is similar to that of the other cases.

Figure 9:
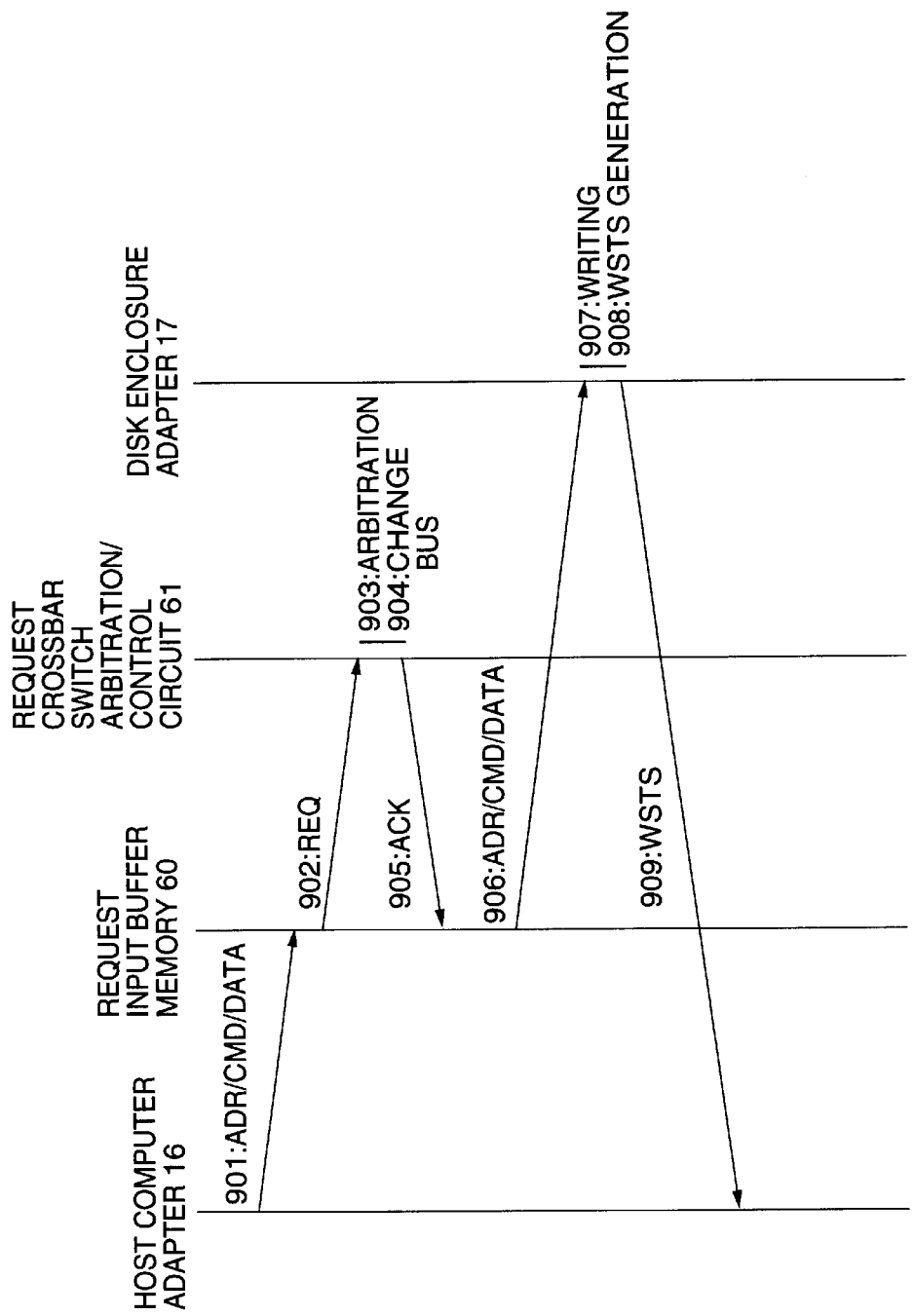
FIG. 9 is a flow chart for schematically showing data write processing from host computer adapters to disk enclosure adapters in the disk array controller illustrated in FIG. 2.

FIG. 9 is a flow chart for schematically showing data write processing from the host computer adapter 16 to the disk enclosure adapter 17 in the disk array controller 11. Hereunder, the data write processing are described in detail referring to FIG. 9 with reference to FIGS. 2 and 4 continued.

As depicted in FIG. 9, ADR (address), CMD (command) and DATA (data) are transferred from the host computer adapter 16 or the disk enclosure adapter 17 to the clossbar switch 20 in step 901. These ADR, CMD and DATA are stored in the request input buffer memory 60 within the clossbar switch 20. A port through which data are outputted to the disk enclosure adapter 17 is judged based on the above ADR and CMD. A connection request is issued to the request clossbar switch arbitration/control circuit 61 in step 902.

When a plurality of connection requests to the same port are generated, the connection requests are arbitrated by the request clossbar switch arbitration/control circuit 61. Even though data stored in the request input buffer memory 60 are in waiting condition for being transferred, next data can be received from the host computer adapter 16 or the disk enclosure adapter 17. This is because a plurality of request input buffer memories 60 are provided with respect to one host computer adapter 16 or one disk enclosure adapter 17. With respect to the data stored in a plurality of the request input buffer memories 60, a connection request can be issued to the request clossbar switch arbitration/control circuit 61 in spite of the order of input.

As the result of arbitration in step 903, it is decided which data can use the port to the memory channel 23. Namely, using right of the port to the memory channel 23 is determined as the result of arbitration in step 903. Bus change is conducted with respect to the request clossbar switch 74. The data are then transferred to the disk enclosure adapter 17. In step 907, the disk enclosure adapter 17 decides a hard disk drive (HDD) to be accessed, based on the received ADR and CMD, and then writes data (DATA) to the hard disk drive (HDD). In step 908, the disk enclosure adapter 17 produces a status (WSTS) as the result of write access to the hard disk drive (HDD). The disk enclosure adapter 17 then sends the WSTS to the host computer adapter 16 as a write request source. At this time, the disk enclosure adapter 17 adds an agent number to WSTS with respect to the write request source, that is, the host computer adapter 16, and then sends the WSTS thereto.

Figure 10:
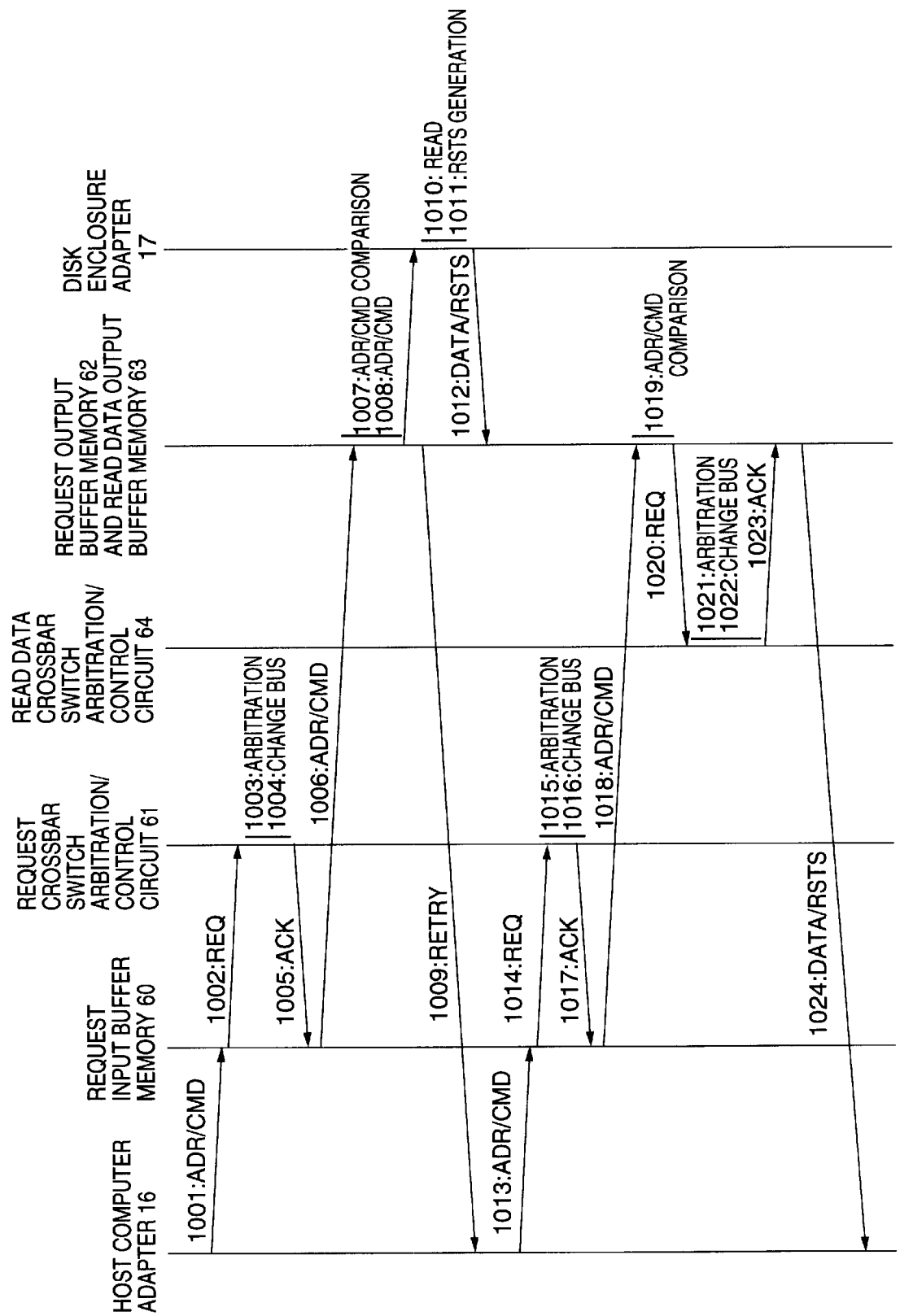
FIG. 10 is a flow chart for schematically showing data read processing from host computer adapters to disk enclosure adapters in the disk array controller illustrated in FIG. 2.

FIG. 10 is a flow chart for schematically showing data read processing from the host computer adapter 16 to the disk enclosure adapter 17 in the disk array controller 11. Hereunder, the data read processing are described in detail referring to FIG. 10 with reference to FIGS. 2 and 4 continued.

As depicted in FIG. 10, ADR and CMD are transferred from the host computer adapter 16 to the clossbar switch 20 in step 1001. These ADR and CMD are stored in the request input buffer memory 60 within the clossbar switch 20. A port through which data are outputted to the disk enclosure adapter 17 is judged based on the above ADR and CMD. A connection request is issued to the request clossbar switch arbitration/control circuit 61 in step 1002. As the result of arbitration in step 1003, bus change is conducted with respect to the request output buffer memory 62 as a destination. In step 1006, ADR and CMD are transferred from the request input buffer memory 60 to the request output buffer memory 62.

In step 1007, these transferred ADR and CMD are compared with another ADR and CMD stored in the read data input buffer memory 63. If requested data are not stored in the read data input buffer memory 63, ADR and CMD are transferred to the memory channel 23. The request clossbar switch arbitration/control circuit 61 requests data read and urges a request source, that is, the host computer adapter 16 to re-try. The re-try urged host computer adapter 16 can issue an access request by the same ADR and CMD again or another access request by another ADR and CMD.

In step 1010, the disk enclosure adapter 17 decides the hard disk drive (HDD) to be accessed, based on the received ADR and CMD, and then reads the data (DATA) from the hard disk drive (HDD). Further, the disk enclosure adapter 17 produces a status (RSTS) as the result of read access to the hard disk drive (HDD). In step 1012, the disk enclosure adapter 17 then sends the read data and the RSTS in this order to the read data input buffer memory 63 in the clossbar switch 20. The read data and the RSTS are then stored in the read data input buffer memory 63. At this time, ADR and CMD used in the access to the disk enclosure adapter 17 are also stored therein as access information.

In step 1013,the host computer adapter 16 issues the same access request as ADR and CMD outputted in step 1001. These ADR and CMD are stored in the request input buffer memory 60. Thereafter, processing similar to those of the steps 1002 to 1006 are conducted. The ADR and CMD are transferred to the request output buffer memory 62 to be stored therein. After the ADR and CMD are stored in the request output buffer memory 62, these ADR and CMD are compared with another ADR and CMD stored in the read data input buffer memory 63 again in step 1019.

If these ADR and CMD are judged to be equal to another ADR and CMD, in step 1020, a request is issued to the read data clossbar switch arbitration/control circuit 64 in order that the read data output buffer memory 65 (which is connected with the host computer adapter 16 as an access request source) are connected with the read data input buffer memory 63. Bus using right is obtained in step 1021. Bus change is then conducted in step 1022. In step 1024, the read data and the RSTS are transferred to the host computer adapter 16 as an access request source.

As described above, according to the preferred embodiment of the present invention, the cache memory has memory modules and a plurality of clossbar switches. Further, a plurality of host computer adapters are connected with a plurality of clossbar switches while a plurality of disk enclosure adapters are connected with a plurality of clossbar switches. Furthermore, a plurality of clossbar switches are connected with the memory modules. Moreover, the clossbar switches have function to directly connect the host computer adapters to the disk enclosure adapters. Accordingly, data transfer between the host computer and the disk enclosure can be carried out, independent on memory data transfer capability to the cache memory. Consequently, throughput in the disk array controller can be so improved.

In other words, data transfer can be carried out between the host computer adapters and the disk enclosure adapters in spite of data transfer speed of the cache memory. This is because, by using the clossbar switches, data transfer can be directly carried out between the host computer adapters and the disk enclosure adapters by way of no cache memory.

On the other hand, according to the preferred embodiment of the present invention, the cache memory has memory modules and a plurality of clossbar switches. Further, a plurality of host computer adapters are connected with a plurality of clossbar switches while a plurality of disk enclosure adapters are connected with a plurality of clossbar switches. Furthermore, a plurality of clossbar switches are connected with the memory modules. Moreover, a plurality of clossbar switches transfer data in synchronization with each other. Accordingly, not only a plurality of access paths to the cache memory are available but also needless waiting time can be eliminated during data transfer. Therefore, throughput to the cache memory can also be improved.

Besides, according to the preferred embodiment of the present invention, the clossbar switches have buffer memories that temporarily store the data transmitted from the host computer adapters or the disk enclosure adapters. Therefore, even if cache addresses of transfer destinations are overlapping in a plurality of access paths, the overlapping can be buffered in the buffer memories. Deterioration of the throughput can be prevented in the disk array controller.

While the present invention has thus far been described in conjunction with only preferred embodiment thereof, it will now be readily possible for one skilled in the art to put this invention into effect in various other manners.

For example, in the above embodiment, a plurality of cache memories are provided in the disk array controller. however, at least one cache memory may be provided in the disk array controller.

Further, in the above embodiment, a plurality of memory modules are included in one cache memory. However, at least one memory module may be included in one cache memory.

What is claimed is:

1. A disk array controller for use in storing data transmitted and received between a host computer and a disk enclosure, said disk array controller comprising:

at least one cache memory which stores data transmitted and received between the host computer and the disk enclosure, said at least one cache memory including at least one memory module and a plurality of crossbar switches connected with said at least one memory module;

a plurality of host computer adapters which connect the host computer with said at least one cache memory, said plurality of host computer adapters being connected with said plurality of crossbar switches;

a plurality of disk enclosure adapters which connect the disk enclosure with said at least one cache memory, said plurality of disk enclosure adapters being connected with said plurality of crossbar switches, wherein said plurality of crossbar switches are operable to directly connect said host computer adapters to said disk enclosure adapters, and wherein any one of said plurality of crossbar switches is operable as a master while the others of said plurality of crossbar switches are operable as slaves controlled by said master.

2. A disk array controller as claimed in claim 1, wherein each of said plurality of crossbar switches directly connects each of said host computer adapters to each of said disk enclosure adapters in response to a command outputted from said host computer adapters.

3. A disk array controller as claimed in claim 1, wherein said plurality of crossbar switches are controlled to transfer data in synchronization with each other.

4. A disk array controller as claimed in claim 2, wherein said plurality of crossbar switches are controlled to transfer data in synchronization with each other.

5. A disk array controller as claimed in claim 1, wherein each of said plurality of crossbar switches includes a buffer memory for temporarily storing data transmitted from said host computer adapters or said disk enclosure adapters.

6. A disk array controller as claimed in claim 5, wherein said data transmitted from said host computer adapters or said disk enclosure adapters include a command and a memory address, said data including said command and said memory address being collectively transmitted to said buffer memory.

7. A disk array controller for use in storing data transmitted and received between a host computer and a disk enclosure, said disk array controller comprising:
- at least one cache memory which stores data transmitted and received between the host computer and the disk enclosure, said at least one cache memory including at least one memory module and a plurality of crossbar switches connected with said at least one memory module;
- a plurality of host computer adapters which connect the host computer with said at least one cache memory; said plurality of host computer adapters being connected with said plurality of crossbar switches; and
- a plurality of disk enclosure adapters which connect the disk enclosure with said at least one cache memory, said plurality of disk enclosure adapters being connected with said plurality of crossbar and switches,
- wherein any one of said plurality of crossbar switches is operable as a master while the others of said plurality of crossbar switches are operable as slaves controlled by said master.

8. A disk array controller as claimed in claim 7, wherein said plurality of crossbar switches are controlled to transfer data in synchronization with each other.

9. A method of controlling a disk array for use in a disk array controller including at least one cache memory which stores data transmitted and received between a host computer and a disk enclosure, a plurality of host computer adapters which connect said host computer with said at least one cache memory, and a plurality of disk enclosure adapters which connect said disk enclosure with said at least one cache memory, said method comprising:
- providing at least one memory module and a plurality of crossbar switches in said at least one cache memory;
- connecting said plurality of host computer adapters with said plurality of crossbar switches;
- connecting said plurality of disk enclosure adapters with said plurality of crossbar switches;
- connecting said plurality of crossbar switches with said at least one memory module;
- directly connecting said host computer adapters to said disk enclosure adapters; and
- operating one of said plurality of crossbar switches as a master while operating the others of said plurality of crossbar switches as slaves controlled by said master.

10. A method of controlling a disk array as claimed in claim 9, wherein each of said plurality of crossbar switches directly connects each of said host computer adapters to each of said disk enclosure adapters in response to a command outputted from each of said host computer adapters.

11. A method of controlling a disk array as claimed in claim 9, wherein said plurality of crossbar switches transfer data in synchronization with each other.

12. A method of controlling a disk array as claimed in claim 10, wherein said plurality of crossbar switches transfer data in synchronization with each other.

13. A method of controlling a disk array as claimed in claim 9, wherein each of said plurality of crossbar switches includes a buffer memory for temporarily storing data transmitted from said host computer adapters or said disk enclosure adapters.

14. A method of controlling a disk array as claimed in claim 13, wherein said data transmitted from said host computer adapters or said disk enclosure adapters include a command and a memory address, said data including said command and said memory address being collectively transmitted to said buffer memory.

15. A method of controlling a disk array for use in a disk array controller including at least one cache memory which stores data transmitted and received between a host computer and a disk enclosure, a plurality of host computer adapters which connect said host computer with said at least one cache memory, and a plurality of disk enclosure adapters which connect said disk enclosure with said at least one cache memory, said method comprising:
- providing at least one memory module and a plurality of crossbar switches in said at least one cache memory;
- connecting said plurality of host computer adapters with said plurality of crossbar switches;
- connecting said plurality of disk enclosure adapters with said plurality of crossbar switches;
- connecting said plurality of crossbar switches with said at least one memory module; and
- operating one of said plurality of crossbar switches as a master while operating the others of said plurality of crossbar switches as slaves controlled by said master.

16. A method of controlling a disk array as claimed in claim 15, wherein said plurality of crossbar switches transfer data in synchronization with each other.

17. A disk array controller for use in storing data transmitted and received between a host computer and a disk enclosure, said disk array controller comprising:
- a plurality of host computer adapters which connect the host computer with said plurality of crossbar switches; and
- a plurality of disk enclosure adapters which connect the disk enclosure with said plurality of crossbar switches,
- wherein any one of said plurality of crossbar switches is operable as a master while the others of said plurality of crossbar switches are operable as slaves controlled by said master.

18. A disk array controller as claimed in claim 17, wherein:
- said plurality of crossbar switches are operable to directly connect said host computer adapters to said disk enclosure adapters.

19. A disk array controller as claimed in claim 17, further comprising a plurality of crossbar switches.

20. A disk array controller as claimed in claim 17, wherein said plurality of crossbar switches are controlled to transfer data in synchronization with each other.

21. A method of controlling a disk array for use in a disk array controller including a host computer, a disk enclosure, plurality of host computer adapters, and a plurality of disk enclosure adapters, said method comprising:
- connecting said plurality of host computer adapters with a plurality of crossbar switches;
- connecting said plurality of disk enclosure adapters with said plurality of crossbar switches; and operating one of said plurality of crossbar switches as a master while operating the others of said plurality of crossbar switches as slaves controlled by said master, so that said plurality of crossbar switches transfer data in synchronization with each other.

22. A method of controlling a disk array as claimed in claim 21, further comprising directly connecting said host computer adapters to said disk enclosure adapters.

* * * * *